United States Patent
Chen et al.

(10) Patent No.: US 8,294,850 B2
(45) Date of Patent: Oct. 23, 2012

(54) LCD PANEL HAVING IMPROVED RESPONSE

(75) Inventors: Cheng Chen, Cupertino, CA (US); John Z. Zhong, Cupertino, CA (US); Ming Xu, Cupertino, CA (US); Mingxia Gu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 501 days.

(21) Appl. No.: 12/415,848

(22) Filed: Mar. 31, 2009

(65) Prior Publication Data

US 2010/0245723 A1 Sep. 30, 2010

(51) Int. Cl.
*G02F 1/1334* (2006.01)

(52) U.S. Cl. .......................... 349/88; 349/186

(58) Field of Classification Search .................. None
See application file for complete search history.

(56) References Cited

U.S. PATENT DOCUMENTS

| | | | |
|---|---|---|---|
| 4,143,947 A * | 3/1979 | Aftergut et al. ............... 349/179 |
| 4,566,758 A * | 1/1986 | Bos ................. 349/128 |
| 4,991,115 A | 2/1991 | Guthrie et al. |
| 5,210,630 A * | 5/1993 | Heynderickx et al. ........ 349/183 |
| 5,396,351 A | 3/1995 | Gessel |
| 5,434,685 A * | 7/1995 | Pirs et al. ..................... 349/88 |
| 5,437,811 A * | 8/1995 | Doane et al. ............. 252/299.01 |
| 5,450,222 A | 9/1995 | Sirkin |
| 5,659,378 A | 8/1997 | Gessel |
| 6,157,426 A | 12/2000 | Gu |
| 6,285,431 B2 | 9/2001 | Lyu |
| 6,403,171 B1 * | 6/2002 | Hirschmann et al. .......... 428/1.1 |
| 6,433,933 B1 | 8/2002 | Gettemy |
| 6,452,651 B1 * | 9/2002 | Takami et al. ................ 349/88 |
| 6,466,285 B1 | 10/2002 | Ichikawa |
| 6,466,290 B2 | 10/2002 | Kim et al. |
| 6,536,933 B1 | 3/2003 | Gettemy et al. |
| 6,545,862 B1 | 4/2003 | Gettemy et al. |
| 6,603,469 B1 | 8/2003 | Gettemy et al. |
| 6,618,044 B1 | 9/2003 | Gettemy et al. |
| 6,642,985 B2 | 11/2003 | Kim |
| 6,685,328 B1 | 2/2004 | Hanson et al. |
| 6,700,560 B2 | 3/2004 | Sumiya |
| 6,710,754 B2 | 3/2004 | Hanson et al. |
| 6,718,115 B1 | 4/2004 | Gettemy et al. |
| 6,723,393 B1 * | 4/2004 | Niyama et al. ................ 428/1.1 |
| 6,741,314 B2 | 5/2004 | Song |
| 6,859,244 B2 | 2/2005 | Kawase et al. |

(Continued)

FOREIGN PATENT DOCUMENTS

JP 2001092382 4/2001

(Continued)

OTHER PUBLICATIONS

U.S. Appl. No. 12/371,284, filed Feb. 13, 2009, Chang et al.

(Continued)

*Primary Examiner* — Mike Stahl
(74) *Attorney, Agent, or Firm* — Fletcher Yoder PC

(57) ABSTRACT

A liquid crystal display (LCD) having a liquid crystal layer is provided. In one embodiment, the liquid crystal layer includes a nematic liquid crystal material having liquid crystal molecules in an untwisted state. A chiral dopant is dispersed within the liquid crystal layer and configured to bias the liquid crystal molecules toward a twisted state. Furthermore, a polymer network is disposed among the liquid crystal molecules and configured to bias the liquid crystal molecules toward the untwisted state. Various additional devices and methods are also provided.

25 Claims, 10 Drawing Sheets

U.S. PATENT DOCUMENTS

| | | | |
|---|---|---|---|
| 6,888,532 B2 | 5/2005 | Wong et al. | |
| 6,919,681 B2 | 7/2005 | Cok | |
| 6,924,752 B2 | 8/2005 | Gettemy et al. | |
| 6,924,863 B2 | 8/2005 | Nishida | |
| 6,947,017 B1 | 9/2005 | Gettemy | |
| 6,965,375 B1 | 11/2005 | Gettemy et al. | |
| 6,992,659 B2 | 1/2006 | Gettemy | |
| 7,002,569 B1 | 2/2006 | Gettemy et al. | |
| 7,006,080 B2 | 2/2006 | Gettemy | |
| 7,034,802 B1 | 4/2006 | Gettemy et al. | |
| 7,048,401 B2 | 5/2006 | Lee et al. | |
| 7,057,579 B2 | 6/2006 | Hanson et al. | |
| 7,057,698 B2 | 6/2006 | Chung | |
| 7,068,256 B1 | 6/2006 | Gettemy et al. | |
| 7,079,119 B2 | 7/2006 | Hanson et al. | |
| 7,091,964 B2 | 8/2006 | Wong et al. | |
| 7,095,387 B2 | 8/2006 | Lee et al. | |
| 7,159,194 B2 | 1/2007 | Wong et al. | |
| 7,167,309 B2 | 1/2007 | Saxena | |
| 7,203,075 B2 | 4/2007 | Terada et al. | |
| 7,248,271 B2 | 7/2007 | Credelle | |
| 7,248,320 B2 | 7/2007 | Hirakata | |
| 7,256,767 B2 | 8/2007 | Wong et al. | |
| 7,268,775 B1 | 9/2007 | Gettemy | |
| 7,304,707 B2 | 12/2007 | Son | |
| 7,324,093 B1 | 1/2008 | Gettemy et al. | |
| 7,339,639 B2 | 3/2008 | Nakano et al. | |
| 7,342,571 B2 | 3/2008 | Fraser et al. | |
| 7,348,964 B1 | 3/2008 | Gettemy et al. | |
| 7,349,052 B2 | 3/2008 | Wu et al. | |
| 7,362,338 B1 | 4/2008 | Gettemy et al. | |
| 7,379,143 B2 | 5/2008 | Lyu | |
| 7,466,373 B2 | 12/2008 | Xu et al. | |
| 7,483,016 B1 | 1/2009 | Gettemy et al. | |
| 2001/0052961 A1* | 12/2001 | Towler et al. | 349/177 |
| 2002/0001052 A1* | 1/2002 | Kornfield et al. | 349/88 |
| 2003/0098857 A1 | 5/2003 | Gettemy et al. | |
| 2003/0160755 A1 | 8/2003 | Gettemy et al. | |
| 2003/0193709 A1* | 10/2003 | Mallya et al. | 359/245 |
| 2004/0046739 A1 | 3/2004 | Gettemy | |
| 2004/0085503 A1 | 5/2004 | Kim | |
| 2004/0160538 A1* | 8/2004 | Li et al. | 349/16 |
| 2005/0139837 A1 | 6/2005 | Lee | |
| 2005/0162585 A1* | 7/2005 | Komitov et al. | 349/88 |
| 2005/0184974 A1 | 8/2005 | Gettemy et al. | |
| 2005/0212999 A1 | 9/2005 | Yang et al. | |
| 2005/0269580 A1 | 12/2005 | D'Angelo | |
| 2006/0018175 A1 | 1/2006 | Liljedahl | |
| 2006/0066805 A1 | 3/2006 | Grunnet-Jepsen | |
| 2006/0197740 A1 | 9/2006 | Xu et al. | |
| 2006/0203169 A1 | 9/2006 | Ozawa | |
| 2006/0232553 A1 | 10/2006 | Wong et al. | |
| 2006/0256264 A1 | 11/2006 | Yang | |
| 2006/0268560 A1 | 11/2006 | Wong et al. | |
| 2006/0279557 A1 | 12/2006 | Gettemy | |
| 2006/0284895 A1 | 12/2006 | Marcu et al. | |
| 2007/0024583 A1 | 2/2007 | Gettemy et al. | |
| 2007/0052617 A1 | 3/2007 | Hanson et al. | |
| 2007/0069975 A1 | 3/2007 | Gettemy et al. | |
| 2007/0070272 A1 | 3/2007 | Gettemy et al. | |
| 2007/0070282 A1 | 3/2007 | Shibahara | |
| 2007/0115417 A1 | 5/2007 | Ge et al. | |
| 2007/0139586 A1 | 6/2007 | Gu et al. | |
| 2007/0152963 A1 | 7/2007 | Wong et al. | |
| 2007/0222927 A1 | 9/2007 | Uehara | |
| 2007/0229475 A1 | 10/2007 | Gettemy et al. | |
| 2007/0229749 A1 | 10/2007 | Kaneko | |
| 2007/0269613 A1* | 11/2007 | Chien et al. | 428/1.1 |
| 2007/0273714 A1 | 11/2007 | Hodge et al. | |
| 2007/0290989 A1 | 12/2007 | Gettemy et al. | |
| 2007/0296693 A1 | 12/2007 | Wong et al. | |
| 2008/0032755 A1 | 2/2008 | Fraser et al. | |
| 2008/0036948 A1 | 2/2008 | Zhong et al. | |
| 2008/0062139 A1 | 3/2008 | Hotelling et al. | |
| 2008/0062140 A1 | 3/2008 | Hotelling et al. | |
| 2008/0062147 A1 | 3/2008 | Hotelling et al. | |
| 2008/0062148 A1 | 3/2008 | Hotelling et al. | |
| 2008/0068549 A1 | 3/2008 | Liao | |
| 2008/0074400 A1 | 3/2008 | Gettemy et al. | |
| 2008/0083569 A1 | 4/2008 | Gettemy et al. | |
| 2008/0117184 A1 | 5/2008 | Gettemy | |
| 2008/0121898 A1 | 5/2008 | Yin et al. | |
| 2008/0137018 A1 | 6/2008 | Lin | |
| 2008/0143946 A1 | 6/2008 | Wang | |
| 2008/0164056 A1 | 7/2008 | Gettemy et al. | |
| 2008/0180801 A1 | 7/2008 | Kobayashi | |
| 2008/0186440 A1 | 8/2008 | Lim | |
| 2008/0204431 A1 | 8/2008 | Chung et al. | |
| 2008/0225217 A1 | 9/2008 | Wakabayashi | |
| 2008/0231959 A1 | 9/2008 | Grip | |
| 2008/0238813 A1 | 10/2008 | Gettemy et al. | |
| 2008/0246726 A1 | 10/2008 | Gettemy | |
| 2008/0259254 A1 | 10/2008 | Kikuchi | |
| 2008/0303998 A1 | 12/2008 | Ohta | |
| 2008/0309627 A1 | 12/2008 | Hotelling et al. | |
| 2008/0309633 A1 | 12/2008 | Hotelling et al. | |
| 2009/0009442 A1 | 1/2009 | Galbraith, Jr. et al. | |
| 2009/0128770 A1* | 5/2009 | Niiyama et al. | 349/186 |

FOREIGN PATENT DOCUMENTS

| | | |
|---|---|---|
| KR | 2004061426 | 7/2004 |
| WO | WO 2008077261 | 7/2008 |

OTHER PUBLICATIONS

U.S. Appl. No. 12/371,316, filed Feb. 13, 2009, Chang et al.
U.S. Appl. No. 12/371,342, filed Feb. 13, 2009, Chen et al.
U.S. Appl. No. 12/371,360, filed Feb. 13, 2009, Gu et al.
U.S. Appl. No. 12/371,364, filed Feb. 13, 2009, Chen et al.
U.S. Appl. No. 12/371,368, filed Feb. 13, 2009, Chen et al.
U.S. Appl. No. 12/371,380, filed Feb. 13, 2009, Chen et al.
U.S. Appl. No. 12/371,409, filed Feb. 13, 2009, Xu et al.
U.S. Appl. No. 12/371,452, filed Feb. 13, 2009, Chang et al.
U.S. Appl. No. 12/236,066, filed Sep. 23, 2008, Gettemy et al.
Jung, Byunghoo, et al.; "Improved Aperture Ratio Through Asymmetric Pixel Electrode Design"; Feb. 13, 1997.
Ge et al., "Fast Response Thin-cell FFS LCDs with Reverse Chiral Dopant," The 15th International Display Workshops, Dec. 3, 2008, pp. 186-188, Niigata, Japan.

\* cited by examiner

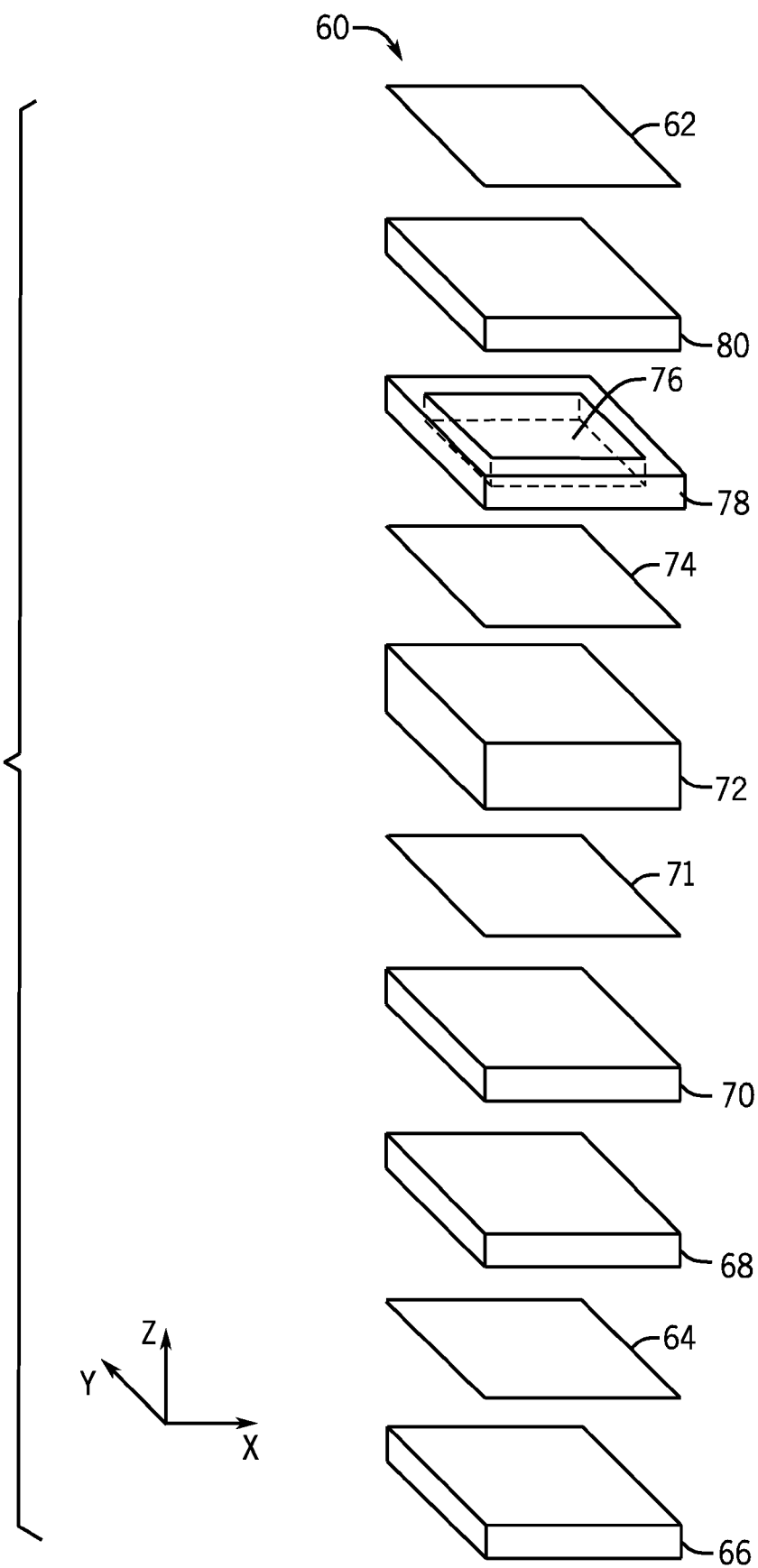

LCD PANEL HAVING IMPROVED RESPONSE

BACKGROUND

1. Technical Field

This disclosure relates generally to electronic display panels, such as liquid crystal displays.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery-powered devices or in other contexts where it is desirable to minimize power usage.

The performance of an LCD may be measured with respect to a variety of factors. For example, the brightness of the display, the visibility of the display when viewed at an angle, the refresh rate of the display, the response time of pixels in the display, and various other factors may all describe an LCD and/or determine whether a display will be useful in the context of a given device. Response time may be determined using a variety of techniques such as measuring transition time between pixel states. For example, response time may be computed by adding a rotation time to a realignment time. Rotation time corresponds to the transition period of the liquid crystal molecules from an orientation that inhibits light transmission to an orientation that facilitates light transmission. Conversely, realignment time corresponds to the transition period of the liquid crystal molecules from an orientation that facilitates light transmission to an orientation that inhibits light transmission. Response time may be reduced by increasing a driving voltage that induces liquid crystal molecule transition. Unfortunately, increasing driving voltage also increases power consumption, and may reduce battery life in portable electric devices having LCDs.

SUMMARY

Certain aspects of embodiments disclosed herein by way of example are summarized below. It should be understood that these aspects are presented merely to provide the reader with a brief summary of certain forms an invention disclosed and/or claimed herein might take, and that these aspects are not intended to limit the scope of any invention disclosed and/or claimed herein. Indeed, any invention disclosed and/or claimed herein may encompass a variety of aspects that may not be set forth below.

The present disclosure relates to reducing response time, decreasing driving voltage and/or increasing transmittance of an LCD. In accordance with the present disclosure, the LCD may include a liquid crystal layer having liquid crystal molecules. A chiral dopant may be dispersed within the liquid crystal layer and configured to bias the liquid crystal molecules toward a twisted state that facilitates light passage through the LCD. Such a configuration may reduce response time and/or decrease driving voltage. Alternatively, the chiral dopant may be configured to bias the liquid crystal molecules toward an untwisted state that inhibits light passage through the LCD. Such a configuration may reduce response time and/or increase transmittance. In addition, a polymer network may be disposed among the liquid crystal molecules and configured to bias the liquid crystal molecules toward the untwisted state, thereby reducing response time of the LCD. The polymer network may be employed alone or in conjunction with the chiral dopant.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present invention without limitation to the claimed subject matter.

BRIEF DESCRIPTION OF THE DRAWINGS

Advantages of the present disclosure may become apparent upon reading the following detailed description and upon reference to the drawings in which:

FIG. 4 is an exploded view of exemplary layers of a pixel of an LCD panel, in accordance with aspects of the present disclosure;

DETAILED DESCRIPTION OF SPECIFIC EMBODIMENTS

One or more specific embodiments will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment.

The application is generally directed to reducing response time, decreasing driving voltage and/or increasing transmittance of an LCD panel. Certain embodiments may include a chiral dopant dispersed within a liquid crystal layer of the LCD. The chiral dopant may reduce response time and/or decrease driving voltage by biasing liquid crystal molecules toward a state that facilitates light passage through the LCD. The chiral dopant may also reduce response time and/or increase transmittance by biasing liquid crystal molecules toward a state that inhibits light passage through the LCD. Certain embodiments may include a polymer network disposed among the liquid crystal molecules and configured to reduce response time by biasing the molecules toward a state that inhibits light passage through the LCD.

Figure 1:
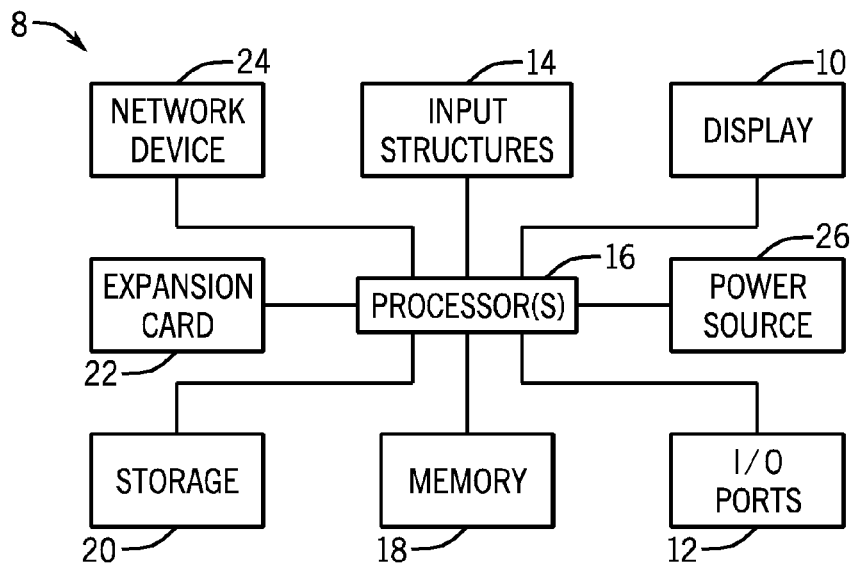
FIG. 1 is a block diagram of exemplary components of an electronic device, in accordance with aspects of the present disclosure.
Figure 3:
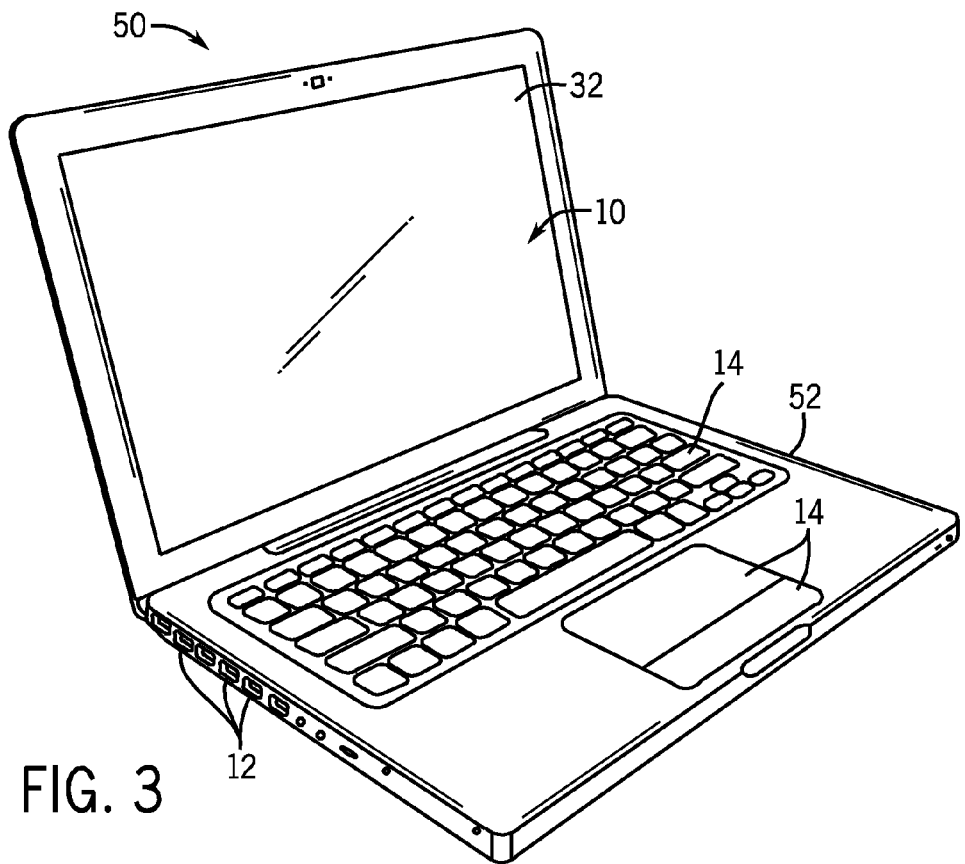
FIG. 3 is a view of a computer in accordance with aspects of the present disclosure.
Figure 2:
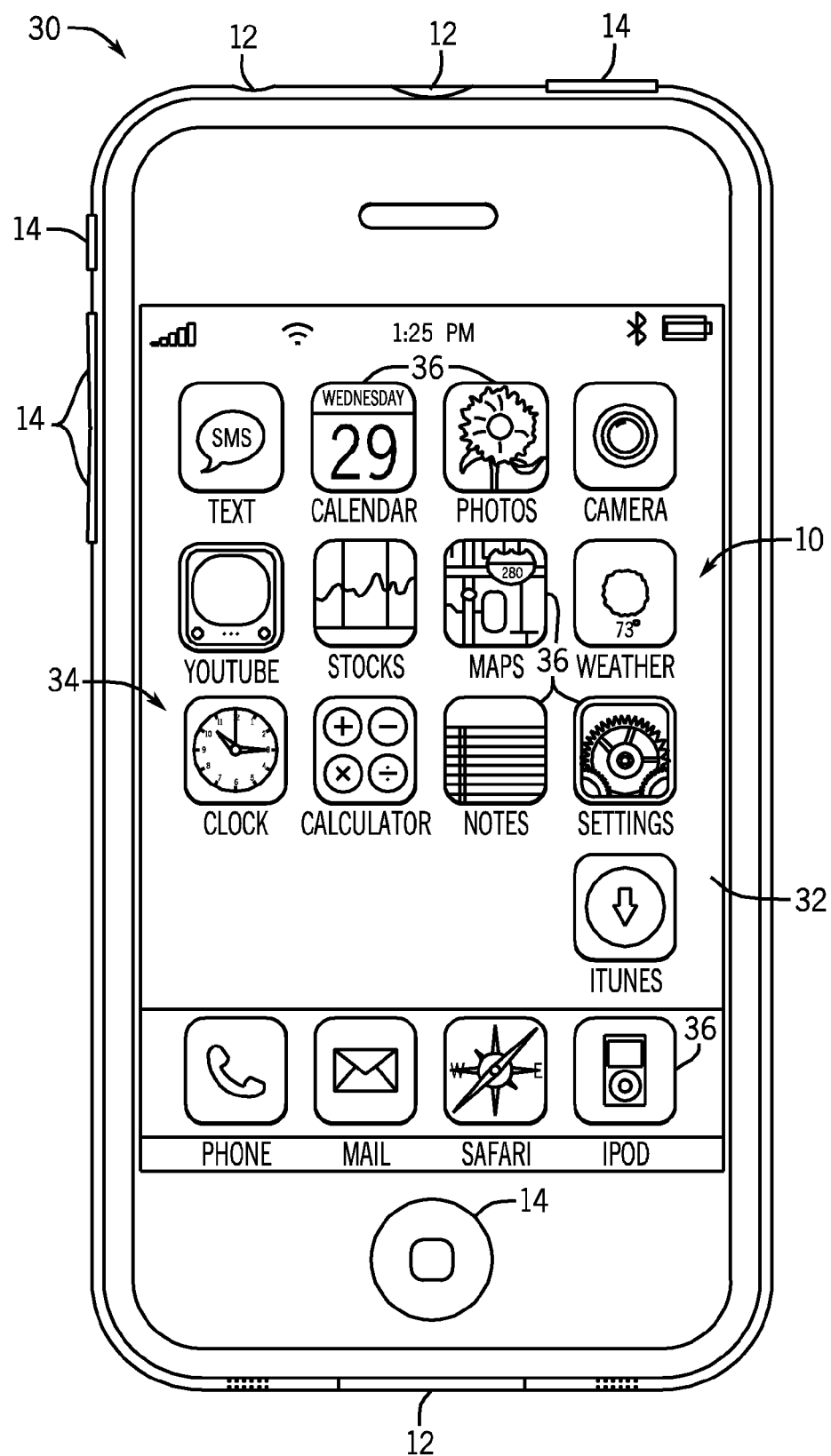
FIG. 2 is a front view of a handheld electronic device in accordance with aspects of the present disclosure.

With these foregoing features in mind, a general description of suitable electronic devices using LCD displays having such reduced response time, decreased driving voltage and/or increased transmittance is provided below. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a computer system, is depicted. These types of electronic devices, and other electronic devices providing comparable display capabilities, may be used in conjunction with the present techniques.

An example of a suitable electronic device may include various internal and/or external components which contribute to the function of the device. FIG. 1 is a block diagram illustrating the components that may be present in such an electronic device 8 and which may allow the device 8 to function in accordance with the techniques discussed herein. Those of ordinary skill in the art will appreciate that the various functional blocks shown in FIG. 1 may include hardware elements (including circuitry), software elements (including computer code stored on a computer-readable medium) or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card(s) 22, a networking device 24, and a power source 26.

With regard to each of these components, the display 10 may be used to display various images generated by the device 8. In one embodiment, the display 10 may be a liquid crystal display (LCD). For example, the display 10 may be an LCD employing fringe field switching (FFS), in-plane switching (IPS), or other techniques useful in operating such LCD devices. Additionally, in certain embodiments of the electronic device 8, the display 10 may be provided in conjunction with a touch-sensitive element, such as a touchscreen, that may be used as part of the control interface for the device 8.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, an IEEE-1394 port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, and so forth.

In certain embodiments, an input structure 14 and display 10 may be provided together, such an in the case of a touchscreen where a touch sensitive mechanism is provided in conjunction with the display 10. In such embodiments, the user may select or interact with displayed interface elements via the touch sensitive mechanism. In this way, the displayed interface may provide interactive functionality, allowing a user to navigate the displayed interface by touching the display 10.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces, and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more reduced instruction set (RISC) processors, as well as graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), various programs, applications, or routines executed on the electronic device 8, user interface functions, processor functions, and so forth. In addition, the memory 18 may be used for buffering or caching during operation of the electronic device 8.

The components may further include other forms of computer-readable media, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store firmware, data files, software, wireless connection information, and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be a flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery or other type of suitable battery. The battery may be user-removable or may be secured within the housing of the electronic device 8, and may be rechargeable. Additionally, the power source 26 may include AC power, such as provided by an electrical outlet, and the electronic device 8 may be connected to the power source 26 via a power adapter. This power adapter may also be used to recharge one or more batteries if present.

With the foregoing in mind, FIG. 2 illustrates an electronic device 8 in the form of a handheld device 30, here a cellular telephone. It should be noted that while the depicted handheld device 30 is provided in the context of a cellular telephone, other types of handheld devices (such as media players for playing music and/or video, personal data organizers, handheld game platforms, and/or combinations of such devices) may also be suitably provided as the electronic device 8. Further, a suitable handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication. By way of example, the handheld device 30 may be a model of an iPod® or iPhone® available from Apple Inc. of Cupertino, Calif.

In the depicted embodiment, the handheld device 30 includes an enclosure or body that protects the interior components from physical damage and shields them from electromagnetic interference. The enclosure may be formed from any suitable material such as plastic, metal or a composite material and may allow certain frequencies of electromagnetic radiation to pass through to wireless communication circuitry within the handheld device 30 to facilitate wireless communication.

In the depicted embodiment, the enclosure includes user input structures 14 through which a user may interface with the device. Each user input structure 14 may be configured to help control a device function when actuated. For example, in a cellular telephone implementation, one or more of the input structures 14 may be configured to invoke a "home" screen or menu to be displayed, to toggle between a sleep and a wake mode, to silence a ringer for a cell phone application, to increase or decrease a volume output, and so forth.

In the depicted embodiment, the handheld device 30 includes a display 10 in the form of an LCD 32. The LCD 32 may be used to display a graphical user interface (GUI) 34 that allows a user to interact with the handheld device 30. The GUI 34 may include various layers, windows, screens, templates, or other graphical elements that may be displayed in all, or a portion, of the LCD 32. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touchscreen included in the display 10, or may be selected by another user input structure 14, such as a wheel or button.

The handheld electronic device 30 also may include various input and output (I/O) ports 12 that allow connection of the handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

In addition to handheld devices 30, such as the depicted cellular telephone of FIG. 2, an electronic device 8 may also take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 8 in the form of a computer may be a model of a MacBook®, Mac- Book® Pro, MacBook Air®, iMac®, Mac® mini, or Mac Pro® available from Apple Inc. By way of example, an electronic device 8 in the form of a laptop computer 50 is illustrated in FIG. 3 in accordance with one embodiment of the present invention. The depicted computer 50 includes a housing 52, a display 10 (such as the depicted LCD 32), input structures 14, and input/output ports 12.

In one embodiment, the input structures 14 (such as a keyboard and/or touchpad) may be used to interact with the computer 50, such as to start, control, or operate a GUI or applications running on the computer 50. For example, a keyboard and/or touchpad may allow a user to navigate a user interface or application interface displayed on the LCD 32.

As depicted, the electronic device 8 in the form of computer 50 may also include various input and output ports 12 to allow connection of additional devices. For example, the computer 50 may include an I/O port 12, such as a USB port or other port, suitable for connecting to another electronic device, a projector, a supplemental display, and so forth. In addition, the computer 50 may include network connectivity, memory, and storage capabilities, as described with respect to FIG. 1. As a result, the computer 50 may store and execute a GUI and other applications.

With the foregoing discussion in mind, it may be appreciated that an electronic device 8 in the form of either a handheld device 30 or a computer 50 may be provided with an LCD 32 as the display 10. Such an LCD 32 may be utilized to display the respective operating system and application interfaces running on the electronic device 8 and/or to display data, images, or other visual outputs associated with an operation of the electronic device 8.

In embodiments in which the electronic device 8 includes an LCD 32, the LCD 32 may include an array or matrix of picture elements (i.e., pixels). In operation, the LCD 32 generally operates to modulate the transmission of light through the pixels by controlling the orientation of liquid crystal disposed at each pixel. In general, the orientation of the liquid crystals is controlled by varying an electrical field associated with each respective pixel, with the liquid crystals being oriented at any given instant by the properties (strength, shape, and so forth) of the electrical field.

Different types of LCDs may employ different techniques in manipulating these electrical fields and/or the liquid crystals. For example, certain LCDs employ transverse electrical field modes in which the liquid crystals are oriented by applying an in-plane electrical field to a layer of the liquid crystals. Example of such techniques include in-plane switching (IPS) and fringe field switching (FFS) techniques, which differ in the electrode arrangement employed to generate the respective electrical fields.

While control of the orientation of the liquid crystals in such displays may be sufficient to modulate the amount of light emitted by a pixel, color filters may also be associated with the pixels to allow specific colors of light to be emitted by each pixel. For example, in embodiments where the LCD 32 is a color display, each pixel of a group of pixels may correspond to a different primary color. For example, in one embodiment, a group of pixels may include a red pixel, a green pixel, and a blue pixel, each associated with an appropriately colored filter. The intensity of light allowed to pass through each pixel (by modulation of the corresponding liquid crystals), and its combination with the light emitted from other adjacent pixels, determines what color(s) are perceived by a user viewing the display. As the viewable colors are formed from individual color components (e.g., red, green, and blue) provided by the colored pixels, the colored pixels may also be referred to as unit pixels.

With the foregoing in mind, and referring once again to the figures, FIG. 4 depicts an exploded view showing different layers that may be implemented in a unit pixel of an LCD 32. The pixel, referred to herein by the reference number 60, includes an upper polarizing layer 62 and a lower polarizing layer 64 that polarize light emitted by a light source 66, which may be provided as a backlight assembly unit or a light-reflective surface. In embodiments where the light source 66 is a backlight assembly unit, any type of suitable lighting device, such as cold cathode fluorescent lamps (CCFLs), hot cathode fluorescent lamps (HCFLs), and/or light emitting diodes (LEDs), may be utilize to provide lighting.

As shown in the present embodiment, a lower substrate 68 is disposed above the lower polarizing layer 64. The lower substrate 68 is generally formed from a light-transparent material, such as glass, quartz, and/or plastic. A thin film transistor (TFT) layer 70 is depicted as being disposed above the lower substrate 68. For simplicity of illustration, the TFT layer 70 is depicted as a generalized structure in FIG. 4. In practice, the TFT layer 70 may itself include various conductive, non-conductive, and semiconductive layers and structures which generally form the electrical devices and pathways which drive operation of the unit pixel 60. For example, in an embodiment in which the pixel 60 is part of an FFS LCD panel, the TFT layer 70 may include the respective data lines (also referred to as "source lines"), scanning lines (also referred to as "gate lines"), pixel electrodes, and common electrodes (as well as other conductive traces and structures) of the pixel 60. Such conductive structures may, in light-transmissive portions of the pixel 60, be formed using transparent conductive materials, such as indium tin oxide (ITO) or indium zinc oxide (IZO), for example. The TFT layer 70 may further include insulating layers (such as a gate insulating film) formed from suitable transparent materials (such as silicon oxide) and semiconductive layers formed from suitable semiconductor materials (such as amorphous silicon). In general, the respective conductive structures and traces, insulating structures, and semiconductor structures may be suitably disposed to form the respective pixel electrodes and common electrodes, a TFT, and the respective data and scanning lines used to operate the unit pixel 60, as described in further detail below with regard to FIG. 5. In the depicted embodiment, a lower alignment layer 71, which may be formed from polyimide or other suitable materials, may be disposed between the TFT layer 70 and a liquid crystal layer 72.

The liquid crystal layer 72 may include liquid crystal molecules suspended in a fluid or embedded in polymer networks. The liquid crystal molecules may be oriented or aligned with respect to an electrical field generated by the TFT layer 70. In practice, the orientation of the liquid crystal molecules in the liquid crystal layer 72 determines the amount of light (e.g., provided by the light source 66) that is transmitted through the pixel 60. Thus, by modulation of the electrical field applied to the liquid crystal layer 72, the amount of light transmitted though the pixel 60 may be correspondingly modulated.

Disposed on the side of the liquid crystal layer 72 opposite from the TFT layer 70 may be one or more alignment and/or overcoating layers 74 interfacing between the liquid crystal layer 72 and an overlying color filter 76. The color filter 76, in certain embodiments, may be a red, green, or blue filter, such that each unit pixel 60 of the LCD 32 corresponds to a primary color when light is transmitted from the light source 66 through the liquid crystal layer 72 and the color filter 76.

The color filter 76 may be surrounded by a light-opaque mask or matrix 78, commonly referred to as a "black mask,"

which circumscribes the light-transmissive portion of the unit pixel 60. For example, in certain embodiments, the black mask 78 may be sized and shaped to define a light-transmissive aperture over the liquid crystal layer 72 and around the color filter 76 and to cover or mask portions of the unit pixel 60 that do not transmit light, such as the scanning line and data line driving circuitry, the TFT, and the periphery of the pixel 60. Further, in addition to defining the light-transmissive aperture, the black mask 78 may serve to prevent light transmitted through the aperture and color filter 76 from diffusing or "bleeding" into adjacent unit pixels.

In the depicted embodiment, an upper substrate 80 may be further disposed between the color filter 76 (including the black mask 78) and the upper polarizing layer 62. In such an embodiment, the upper substrate may be formed from light-transmissive glass, quartz, and/or plastic.

Figure 5:
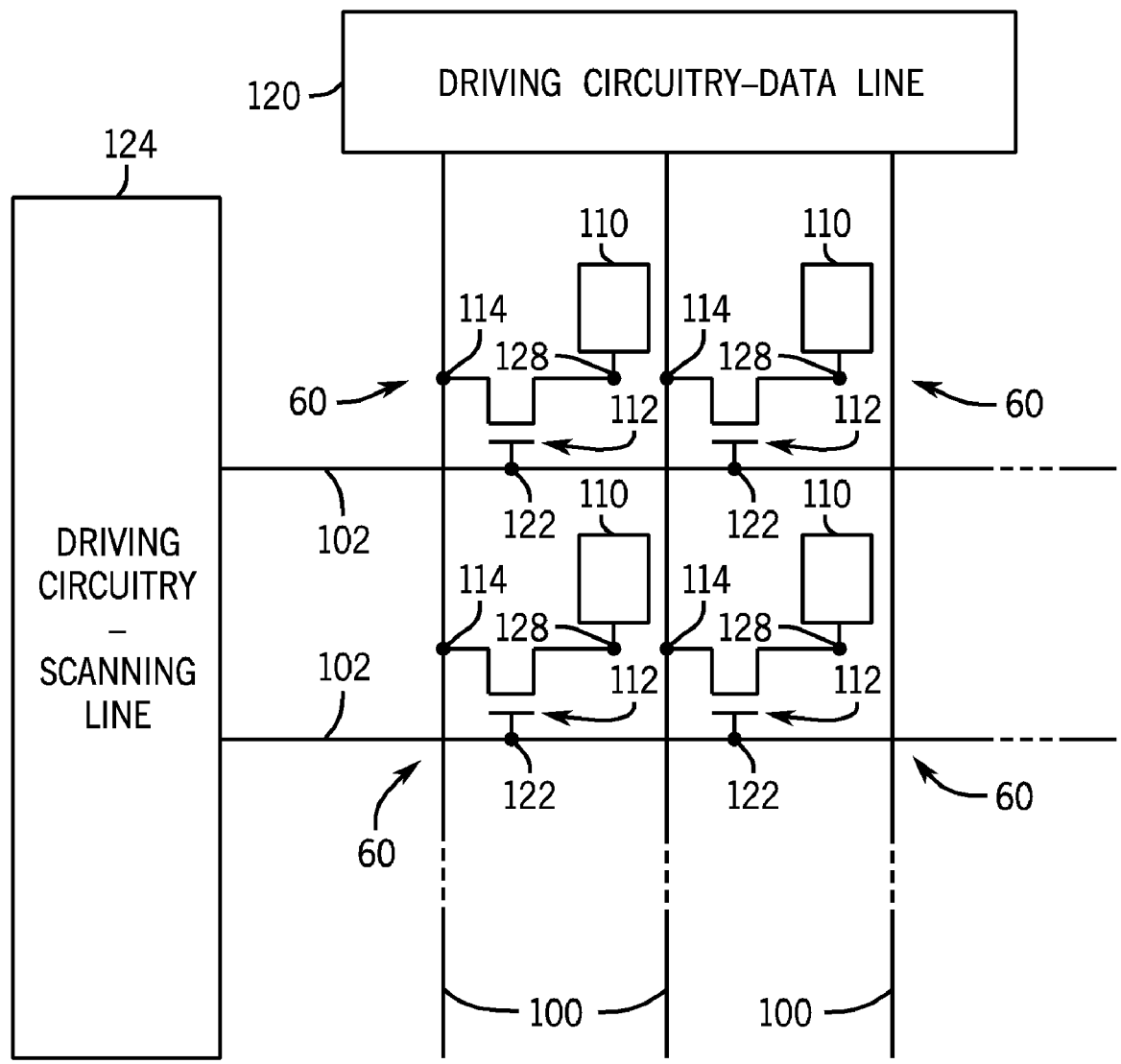
FIG. 5 is a circuit diagram of switching and display circuitry of LCD pixels, in accordance with aspects of the present disclosure.

Referring now to FIG. 5, an example of a circuit view of pixel driving circuitry found in an LCD 32 is provided. For example, such circuitry as depicted in FIG. 5 may be embodied in the TFT layer 70 described with respect to FIG. 4. As depicted, the pixels 60 may be disposed in a matrix that forms an image display region of an LCD 32. In such a matrix, each pixel 60 may be defined by the intersection of data lines 100 and scanning or gate lines 102.

Each pixel 60 includes a pixel electrode 110 and thin film transistor (TFT) 112 for switching the pixel electrode 110. In the depicted embodiment, the source 114 of each TFT 112 is electrically connected to a data line 100, extending from respective data line driving circuitry 120. Similarly, in the depicted embodiment, the gate 122 of each TFT 112 is electrically connected to a scanning or gate line 102, extending from respective scanning line driving circuitry 124. In the depicted embodiment, the pixel electrode 110 is electrically connected to a drain 128 of the respective TFT 112.

In one embodiment, the data line driving circuitry 120 sends image signals to the pixels via the respective data lines 100. Such image signals may be applied by line-sequence, i.e., the data lines 100 may be sequentially activated during operation. The scanning lines 102 may apply scanning signals from the scanning line driving circuitry 124 to the gate 122 of each TFT 112 to which the respective scanning lines 102 connect. Such scanning signals may be applied by line-sequence with a predetermined timing and/or in a pulsed manner.

Each TFT 112 serves as a switching element which may be activated and deactivated (i.e., turned on and off) for a predetermined period based on the respective presence or absence of a scanning signal at the gate 122 of the TFT 112. When activated, a TFT 112 may store the image signals received via a respective data line 100 as a charge in the pixel electrode 110 with a predetermined timing.

The image signals stored at the pixel electrode 110 may be used to generate an electrical field between the respective pixel electrode 110 and a common electrode. Such an electrical field may align liquid crystals within the liquid crystal layer 72 (FIG. 4) to modulate light transmission through the liquid crystal layer 72. In some embodiments, a storage capacitor may also be provided in parallel to the liquid crystal capacitor formed between the pixel electrode 110 and the common electrode to prevent leakage of the stored image signal at the pixel electrode 110. For example, such a storage capacitor may be provided between the drain 128 of the respective TFT 112 and a separate capacitor line.

Figure 6:
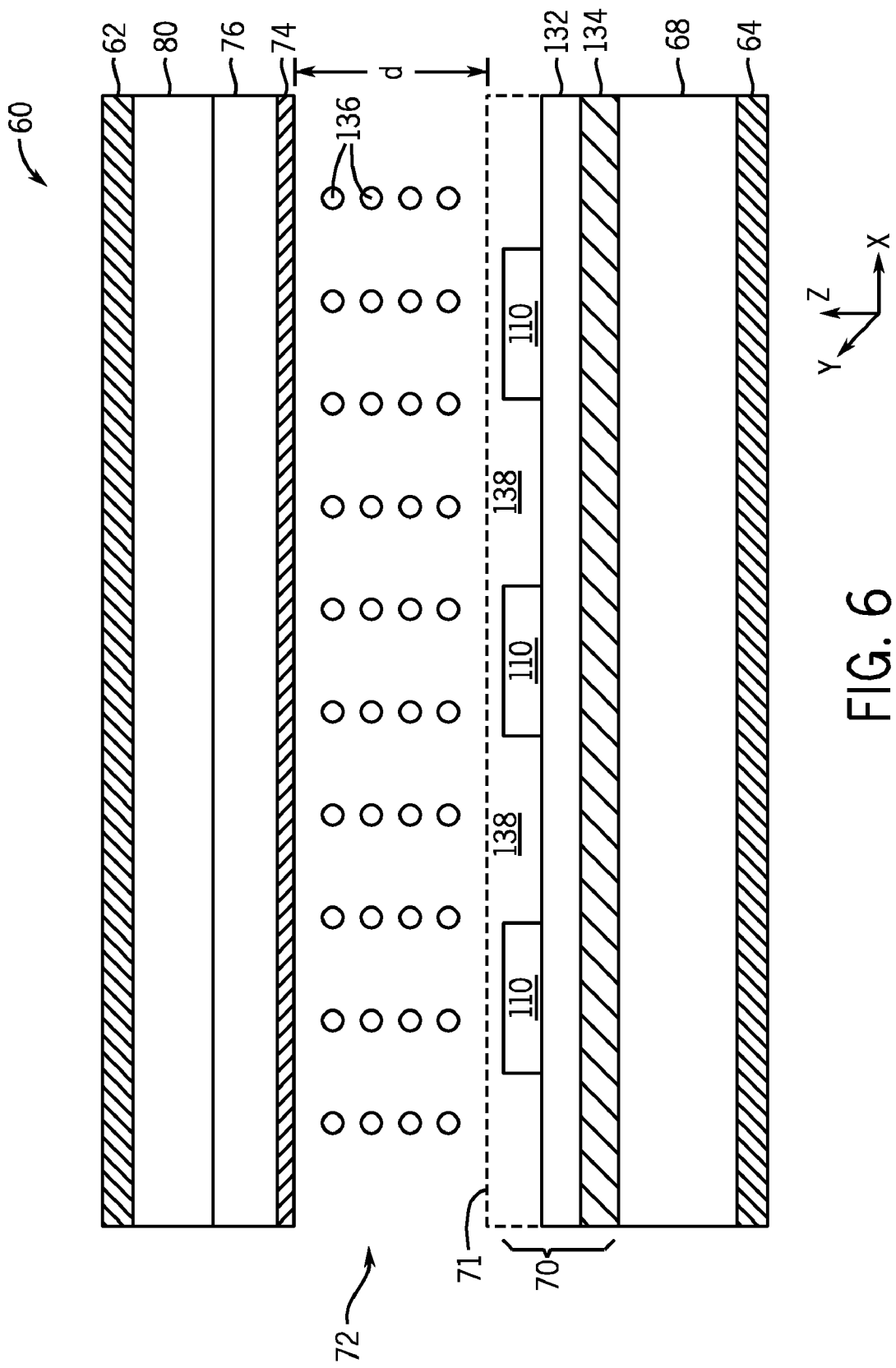
FIG. 6 is a cutaway cross-sectional side view of an LCD pixel having liquid crystal molecules oriented to inhibit light passage, in accordance with aspects of the present disclosure.

The operation of a pixel 60 of the LCD 32 and, particularly, the arrangement of the pixel electrodes 110 and the common electrodes discussed in FIG. 5 may be better understood with respect to FIG. 6, which illustrates the operation of the pixel 60 via a cutaway cross-sectional side view. As shown, the view of the pixel 60 in FIG. 6 includes the layers generally described above with reference to FIG. 4, including the upper polarizing layer 62, lower polarizing layer 64, lower substrate 68, TFT layer 70, liquid crystal layer 72, alignment layers 71 and 74, color filter 76, and upper substrate 80.

As mentioned above, the TFT layer 70, which was depicted as a generalized structure in FIG. 4, may include various conductive, non-conductive, and/or semiconductive layers and structures defining electrical devices and pathways for driving the operation of pixels 60. In the illustrated embodiment, the TFT layer 70 is shown in the context of a fringe field switching (FFS) LCD display device and includes the pixel electrode 110, an insulating layer 132, and a common electrode layer 134. The common electrode layer 134 is disposed above the lower substrate 68, and the insulating layer 132 is disposed between the pixel electrode 110 and the common electrode 134.

The pixel electrodes 110 and the common electrode layer 134 may be made of a transparent conductive material, such as ITO or IZO, as mentioned above. The common electrode layer 134 generally spans the pixel 60, and may be connected to a common line (not shown), which may be parallel to a scanning line 102. The pixel electrodes 110 may be formed as having one or more slit-like voids 138, such that the portions of the pixel electrode 110 define "strip-like" or "finger-like" electrode shapes that generally lie within a plane of the LCD 32 defined by the x-axis and y-axis (x-y plane), as depicted by the reference axes shown in FIG. 6. As shown in the present figure, portions of the lower alignment layer 71 may at least partially protrude into the region defined by the slits 138.

In accordance with FFS LCD operating principles, liquid crystal molecules 136 within the liquid crystal layer 72 may have a "default" orientation in a first direction based upon the configuration (e.g., the "rub" direction) of the lower 71 and upper alignment layers 74. For present explanatory purposes, the default orientation of the liquid crystal molecules 136 in the illustrated embodiment is generally along the y-axis of the LCD 32. In other words, both the lower alignment layer 71 and the upper alignment layer 74 are configured to generally orient the liquid crystal molecules 136 along the y-axis. However, as will be appreciated, the default orientation of the liquid crystal molecules 136 may be generally along the x-axis, z-axis, or a combination of the three axes in further embodiments. Moreover, in certain embodiments, the default orientation may be angled with respect to one or more axes to facilitate rotation of the liquid crystal molecules in a uniform direction.

A thickness d of the liquid crystal layer 72 is defined by the spacing between the upper alignment layer 74 and the lower alignment layer 71, also referred to as the cell gap. The thickness d of the liquid crystal layer 72 may affect various properties of the LCD 32 such as response time R, light transmittance T and/or driving voltage V, among other properties. For purposes of illustration, four liquid crystal molecules 136 are spaced between the alignment layers 71 and 74. Certain embodiments may include more liquid crystal molecules 136 spaced along the z-axis. In addition, while the liquid crystal molecules 136 are depicted as being arranged in substantially parallel columns, embodiments may include liquid crystal molecules 136 offset in the x-axis.

In the default orientation, the liquid crystal molecules 136 are arranged to inhibit light passage through the LCD 32. Specifically, in the present embodiment, the polarization axis of the lower polarizing layer 64 may be oriented approximately 90 degrees relative to the upper polarizing layer 62. As will be appreciated, when light passes through a polarizing filter, the light becomes polarized along the polarization axis of the filter. In other words, the filter blocks the passage of light having any polarization axis other than the polarization axis of the filter. Therefore, light passing through the lower polarizing layer 64 may become polarized along the polarization axis of the lower polarizing layer 64. If each liquid crystal molecule 136 is oriented along substantially the same axis as the lower polarizing layer 64, the light may maintain its polarization axis while passing through the liquid crystal layer 72. Therefore, when the light impacts the upper polarizing layer 62, the polarization axis of the light is approximately 90 degrees offset from the polarization axis of the upper polarizing layer 62.

As previously discussed, a polarizing filter blocks the passage of light having a polarization axis offset from the polarization axis of the filter. Therefore, because the light is polarized 90 degrees relative to the polarization axis of the upper polarizing layer 62, substantially no light passes through the upper polarizing layer 62. Consequently, the default orientation of the liquid crystal molecules 136 substantially inhibits the passage of light through the LCD 32.

Figure 7:
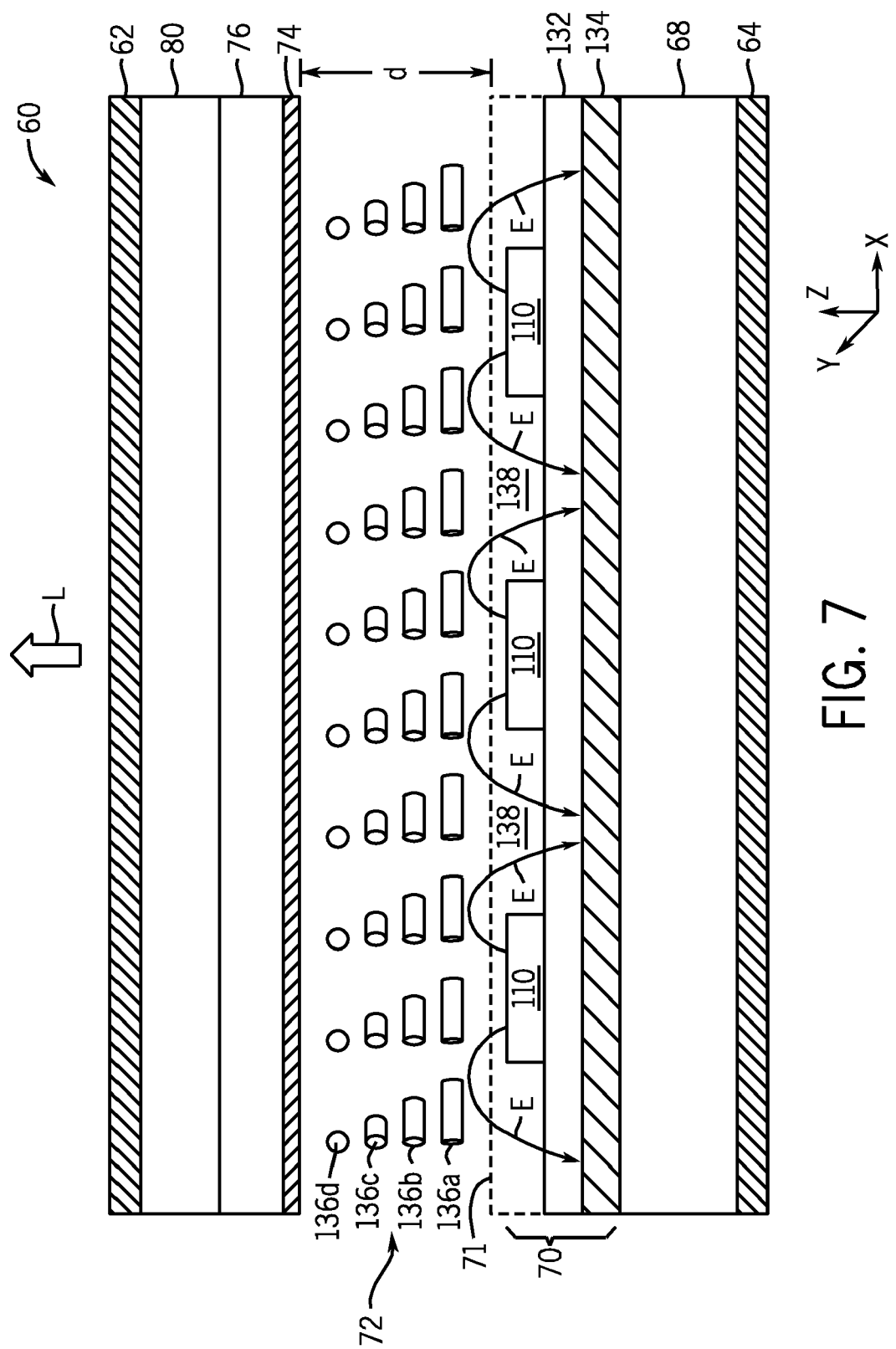
FIG. 7 is a cutaway cross-sectional side view of an LCD pixel having liquid crystal molecules oriented to facilitate light passage, in accordance with aspects of the present disclosure.

As illustrated in FIG. 7, liquid crystal molecules 136 may be oriented to facilitate light passage through the LCD 32. Specifically, when a driving voltage V is applied to the pixel electrode 110, an electrical field is formed between the pixel electrodes 110 and common electrode layer 134. As discussed above, the electrical field (referred to herein by the reference label E) controls the orientation of liquid crystal molecules 136 within the liquid crystal layer 72, such that the orientation changes with respect to the default orientation, thereby allowing at least a portion of the light transmitted from the light source 66 (not shown in FIGS. 6 and 7) to be transmitted through the LCD 32. Thus, by modulating the electrical field E, the light provided by the light source 66 and transmitted through the LCD 32 may be controlled. In this manner, image data sent along the data lines 100 and scanning lines 102 may be perceived by a user viewing the LCD 32 as an image.

For example, the liquid crystal molecules 136 in the present embodiment are configured to twist in response to the electrical field E. Specifically, the electrical field E may induce liquid crystal molecules 136 to rotate about the z-axis from an orientation substantially aligned with the y-axis toward an orientation substantially aligned with the x-axis. As will be appreciated, a magnitude of the electrical field E may decrease as distance from the pixel electrode 110 increases. As a result, the liquid crystal molecules 136 positioned closer to the pixel electrode 110 may rotate to a greater extent than the liquid crystal molecules 136 positioned farther from the pixel electrode 110. Therefore, the liquid crystal molecules 136 may be arranged in a substantially twisted pattern, as illustrated in FIG. 7.

It is noted that the polarization axis of light may be influenced by the orientation of the liquid crystal molecules 136. For example, light passing through the lower polarizing layer 64 may be polarized in a direction substantially parallel to the y-z plane. As the light passes through the twisted liquid crystal molecules 136, the polarization axis of the light may rotate toward the x-z plane. Specifically, because molecule 136a is substantially oriented along the x-axis, molecule 136a may induce the polarization axis of the light to rotate toward the x-axis. Similarly, as the light passes through molecules 136b and 136c, the polarization axis of the light may be further rotated because molecules 136b and 136c are at least partially oriented along the x-axis. Conversely, because molecule 136d is oriented substantially along the y-axis, the polarization axis of the light may rotate back toward the y-z plane. However, the overall orientation of the liquid crystal molecules 136 may establish a net rotation toward the x-z plane. Therefore, a portion of the light may pass through the upper polarizing layer 62 because the polarization axis of the light has rotated toward the polarization axis of the upper polarizing layer 62, i.e., offset from the polarization axis of the lower polarizing layer 64 or rotated toward the x-z plane.

In this configuration, LCD 32 may facilitate light passage when electrical field E is activated and inhibit light passage when electrical field E is deactivated. As illustrated in FIG. 7, the light passes through the upper polarizing layer 62 in a direction L. As will be appreciated, alternative orientations of the polarizing layers 62 and 64, as well as alternative configurations of the liquid crystal molecules 136 may be employed in further embodiments. Moreover, the electrical field E may cause the liquid crystal molecules 136 to rotate about other axes, such as the x-axis and/or the y-axis, in certain configurations.

The electrical field E may induce liquid crystal molecules 136 to rotate over a finite time period, $T_{on}$. Rotation time $T_{on}$ may be affected by a variety of factors such as viscosity of the liquid crystal layer 72, spacing between pixel electrodes 110, width of pixel electrodes 110, thickness d of the liquid crystal layer 72 and/or magnitude of the electrical field E, among other factors. For example, rotation time $T_{on}$ may be reduced by increasing the magnitude of the electrical field E. However, such an increased electrical field magnitude may involve applying additional driving voltage V between the pixel electrode 110 and the common electrode 134. As a result, a battery within a portable device may be drained more rapidly. Therefore, it may be desirable to reduce rotation time $T_{on}$ without increasing the electrical field magnitude. Similarly, it may be desirable to reduce the electrical field magnitude without increasing rotation time $T_{on}$.

In addition, when the electrical field E is removed from the liquid crystal molecules 136, the molecules 136 may rotate back to their initial state over a time period $T_{off}$. The sum of the rotation time $T_{on}$ and the realignment time $T_{off}$ corresponds to the response time R of the LCD 32. Alternative methods of computing response time R such as measuring a transition period between pixel states (e.g., gray-to-gray) may also be employed. Faster response time R may facilitate higher frame rates for video playback on the LCD 32 and/or smoother transitions between images.

Figure 8:
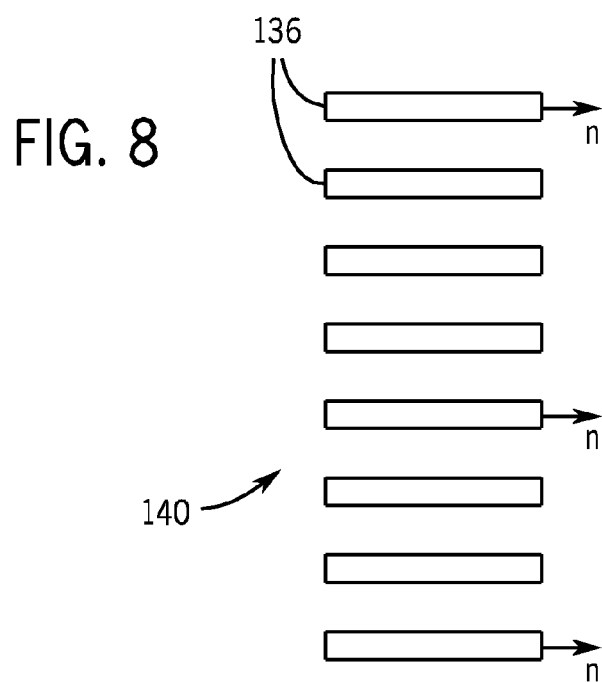
FIG. 8 depicts liquid crystal molecules in a nematic phase, in accordance with aspects of the present disclosure.

FIG. 8 depicts a nematic phase liquid crystal material 140 that may be included within the liquid crystal layer 72. As illustrated, the liquid crystal molecules 136 within the nematic phase material 140 may include directors n orientated in substantially the same direction. In other words, the liquid crystal molecules 136 may be substantially parallel to one another. Absent an external force, intermolecular forces between the liquid crystal molecules 136 of a nematic phase material 140 may maintain the molecules 136 in the illustrated orientation. Therefore, the nematic phase material 140 may be well suited for the previously described LCD 32 because the liquid crystal molecules 136 may remain oriented in one direction outside the presence of the electrical field E. Upon application of the electrical field E, liquid crystal molecules 136 within the nematic phase material 140 may twist as previously described. Conversely, once the electrical field E is deactivated, intermolecular forces may direct the liquid crystal molecules 136 to return to their original alignment, i.e., untwisted orientation.

Figure 9:
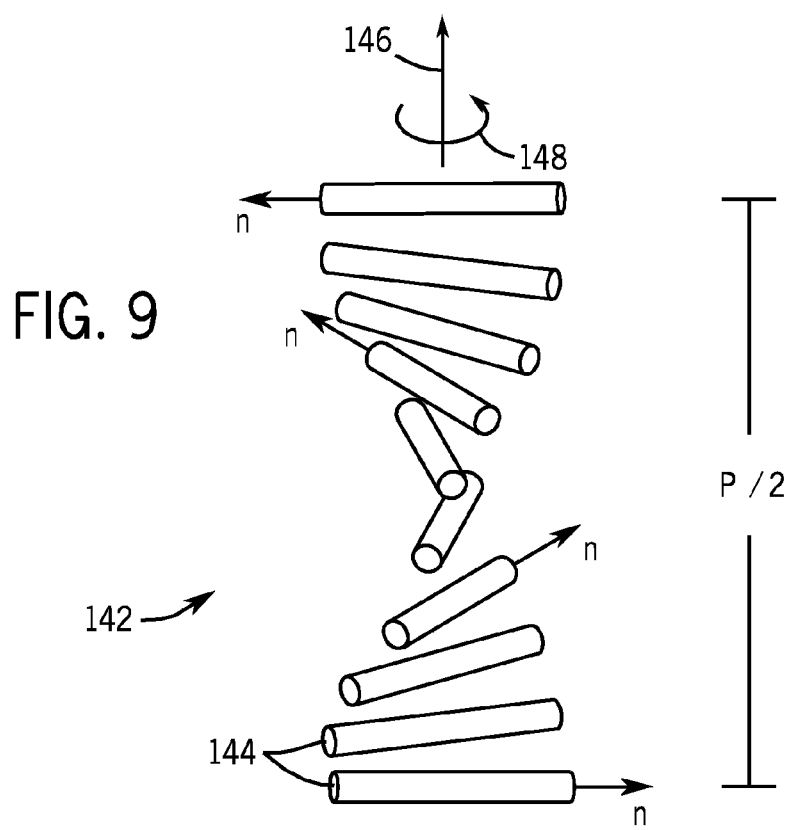
FIG. 9 depicts a chiral dopant having twisted molecules, in accordance with aspects of the present disclosure.

FIG. 9 depicts a chiral dopant 142 that may be included within the liquid crystal layer 72. As compared to the parallel molecules of the nematic phase material 140, the chiral dopant 142 includes molecules 144 twisted about a longitudinal axis 146. Specifically, directors n rotate about the longitudinal axis 146 in a counter-clockwise direction 148, forming a right-handed or positive chiral dopant 142. The twisted pattern is established by intermolecular forces that urge each molecule 144 to align at a slight angle to a neighboring molecule 144. A pitch p of the chiral dopant 142 may be defined as the length over which the directors n rotate 360 degrees about the longitudinal axis 146. The chiral dopant 142 illustrated in FIG. 9 only shows an approximately 180 degree rotation of the directors n. Therefore, the length of the illustrated chiral dopant 142 is half of the pitch, p/2. The smaller the pitch, the greater the twist of the chiral dopant 142.

In certain embodiments, the chiral dopant 142 may be dispersed within the nematic phase material 140 of the liquid crystal layer 72. The naturally twisted orientation of the chiral dopant 142 may bias the nematic phase material 140 toward a twisted state. As previously discussed, the liquid crystal molecules 136 twist in response to an electrical field E, causing light to pass through the LCD 32. For example, the liquid crystal molecules 136 in the embodiment depicted in FIG. 7 are configured to twist in a counter-clockwise direction. Therefore, a right-handed chiral dopant 142 may bias the liquid crystal molecules 136 toward a twisted state that facilitates light transmission. By way of example, the right-handed chiral dopant 142 may be a dopant designated as CB15 available from Merck Chemicals of Darmstadt, Germany. Conversely, if the liquid crystal molecules 136 are configured to twist in a clockwise direction, a left-handed or negative chiral dopant 142 may bias the molecules 136 toward the twisted state. For example, the left-handed chiral dopant 142 may be a dopant designated as ZLI-811 available from Merck Chemicals.

The bias may reduce rotation time $T_{on}$ by facilitating faster twisting of the liquid crystal molecules 136. However, the bias may also increase realignment time $T_{off}$ by the same mechanism. In certain configurations, the reduction in $T_{on}$ may be greater than the increase in $T_{off}$, thus establishing a net faster response time R of the LCD 32. Furthermore, the magnitude of the electrical field E may be reduced due to the biasing effect of the chiral dopant 142. For example, the chiral dopant 142 may enable a smaller electrical field to produce a similar response time R to a larger electrical field without the presence of the chiral dopant 142. This configuration may reduce the driving voltage V, thereby decreasing electrical power consumption of the LCD 32 and enhancing battery life for portable devices.

The concentration and the pitch p of the chiral dopant 142 may influence the degree of bias on the liquid crystal molecules 136, and hence the reduction in response time R and/or electrical field E magnitude. For example, the smaller the pitch p, the greater the biasing effect on the nematic phase material 140. Pitch p may be expressed as a non-dimensional ratio d/p between the thickness d of the liquid crystal layer 72 and the pitch p of the chiral dopant 142. Certain embodiments may employ a chiral dopant 142 with a pitch ratio d/p of less than about 1. Further embodiments may employ chiral dopants 142 having a pitch ratio d/p of approximately 0.01, 0.05, 0.1, 0.2, 0.3, 0.4, 0.5, 0.55, 0.6, 0.7, 0.8, 0.9 or any pitch ratio d/p therebetween. Increased pitch ratios d/p, having smaller pitches p, may produce faster response times R and/or reduced electrical consumption.

Similarly, the biasing effect on the nematic phase material 140 may be proportional to the concentration of the chiral dopant 142. In other words, higher chiral dopant concentrations may increase the twisting bias on the nematic phase material 140. Certain embodiments may include a liquid crystal layer 72 having less than 1% chiral dopant 142 by weight. Other embodiments may employ chiral dopant weight concentrations of approximately 0.01%, 0.05%, 0.1%, 0.2%, 0.3%, 0.5%, 0.75%, 0.9%, or any concentration therebetween. Higher chiral dopant concentrations may reduce response time R and/or driving voltage V.

However, excessive chiral dopant concentrations may cause the liquid crystal molecules 136 to twist outside the presence of the electrical field E. Such a condition may be undesirable because the electrical field E may no longer be capable of sufficiently modulating light passage through each pixel 60 of the LCD 32. In other words, each pixel 60 may allow light to pass through without the influence of the electrical field E. As a result, images may not be properly formed on the LCD 32. Therefore, in one embodiment, the concentration of chiral dopant 142 may be particularly selected to bias the liquid crystal molecules 136 toward a twisted state without causing the molecules 136 to twist.

Figure 10:
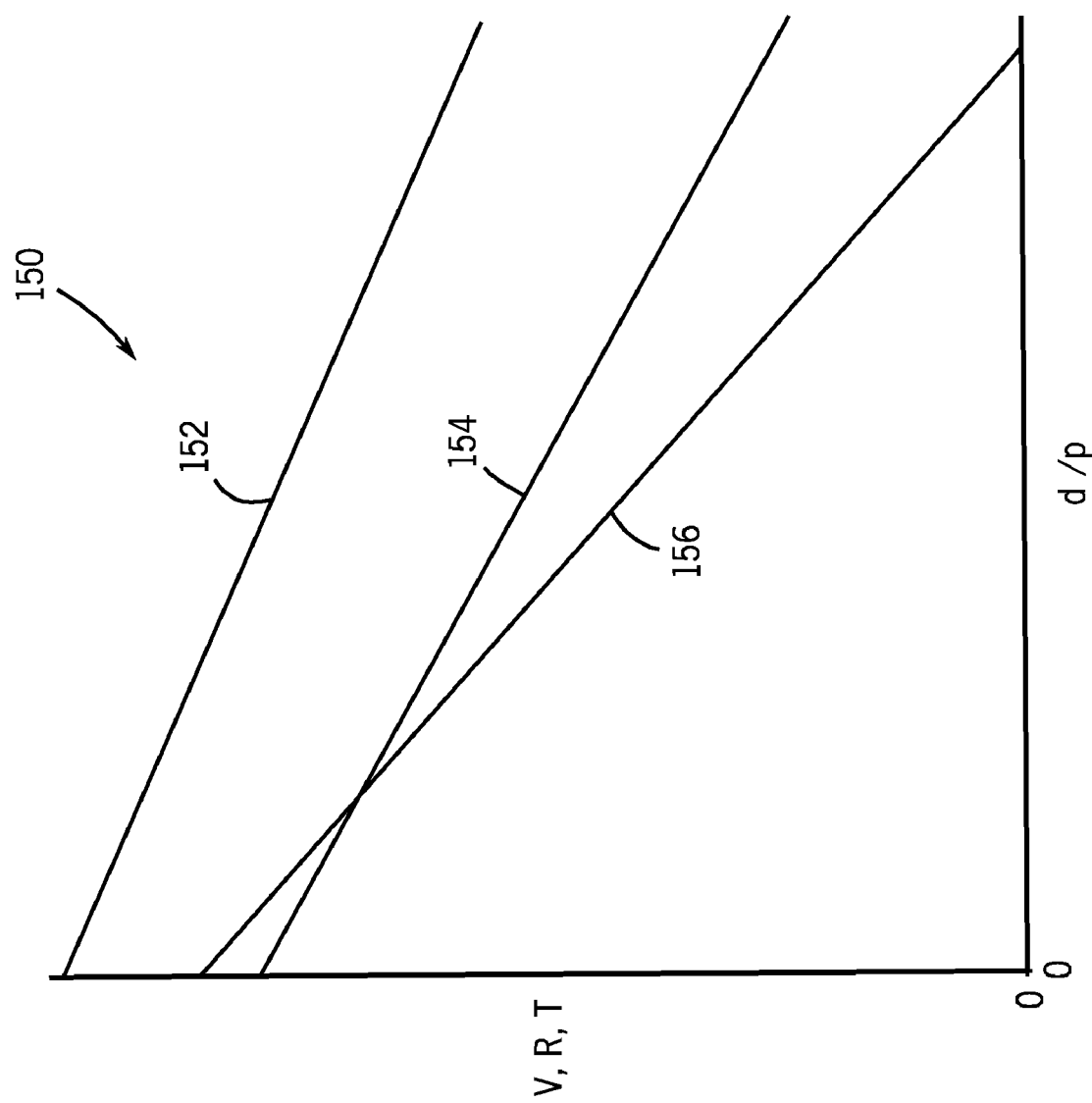
FIG. 10 is a graph of driving voltage, response time and transmittance as a function of chiral dopant pitch ratio, in accordance with aspects of the present disclosure.

Furthermore, the chiral dopant 142 may reduce the transmittance T of light through the LCD 32. FIG. 10 is a graph 150 of the effect of pitch ratio d/p on the response time R, driving voltage V and transmittance T. Specifically, the x-axis represents the pitch ratio d/p and the y-axis generally represents the driving voltage V, the response time R and the transmittance T. Curve 152 illustrates the relationship between pitch ratio d/p and driving voltage V. As previously discussed, as pitch ratio d/p increases, driving voltage V may be decreased. Similarly, as illustrated by curve 154, as pitch ratio d/p increases, response time R may decrease. Furthermore, as represented by curve 156, transmittance T may also decrease as pitch ratio d/p increases. While the above relationships are depicted as linear for purposes of illustration, the shape of curves 152, 154 and 156 may be dependent on the LCD 32 configuration. For example, concentration of chiral dopant 142 within the liquid crystal layer 72 may affect the shape of curves 152, 154 and 156.

For example, the following table presents simulation data of the effect of pitch ratio d/p on rotation time $T_{on}$, realignment time $T_{off}$, response time R, driving voltage V and transmittance T.

TABLE 1

| d/p | $T_{on}$ (ms) | $T_{off}$ (ms) | R (ms) | V (v) | T (%) |
| --- | --- | --- | --- | --- | --- |
| 0 | 16.4 | 22.2 | 38.6 | 5.0 | 17.90 |
| 0.2 | 14.0 | 22.8 | 36.8 | | |
| 0.5 | 9.9 | 24.2 | 34.1 | 4.3 | 16.48 |
| 0.8 | | | | 3.2 | 13.42 |

In alternative embodiments, a chiral dopant 142 may be included within liquid crystal layer 72 that biases the liquid crystal molecules 136 toward an untwisted or aligned state. For example, the liquid crystal molecules 136 in the embodiment depicted in FIG. 7 are configured to twist in a counter-clockwise direction. Therefore, a left-handed chiral dopant 142 may bias the liquid crystal molecules 136 toward an untwisted state that substantially inhibits light transmission. Conversely, if the liquid crystal molecules 136 are configured to twist in a clockwise direction, a right-handed chiral dopant 142 may bias the molecules 136 toward an untwisted state.

This reverse bias may reduce realignment time $T_{off}$ by facilitating faster realignment of the liquid crystal molecules 136. However, the reverse bias may also increase rotation time $T_{on}$ by the same mechanism. In certain configurations, the reduction in $T_{off}$ may be greater than the increase in $T_{on}$, thus establishing a net faster response time R of the LCD 32. However, the magnitude of the electrical field E may be increased due to the reverse biasing effect of the chiral dopant 142. In other words, additional driving voltage V may be applied to achieve a desired response time R. Another effect of the reverse bias may be an increase in transmittance T due to better alignment of liquid crystal molecules 136 within the LCD 32. Therefore, selection of right-handed or left-handed chiral dopant may be dependent on desired performance characteristics of the LCD 32.

For example, the following table presents simulation data of the effect of pitch ratio d/p on rotation time $T_{on}$, realignment time $T_{off}$, response time R, driving voltage V and transmittance T for a reverse biasing chiral dopant.

TABLE 2

| d/p | $T_{on}$ (ms) | $T_{off}$ (ms) | R (ms) | V (v) | T (%) |
|---|---|---|---|---|---|
| 0 | 16.4 | 22.2 | 38.6 | 5.0 | 17.90 |
| 0.2 | 18.6 | 21.8 | 40.4 | 5.1 | 18.00 |
| 0.5 | 19.0 | 20.6 | 39.6 | 5.2 | 18.13 |

Figure 11:
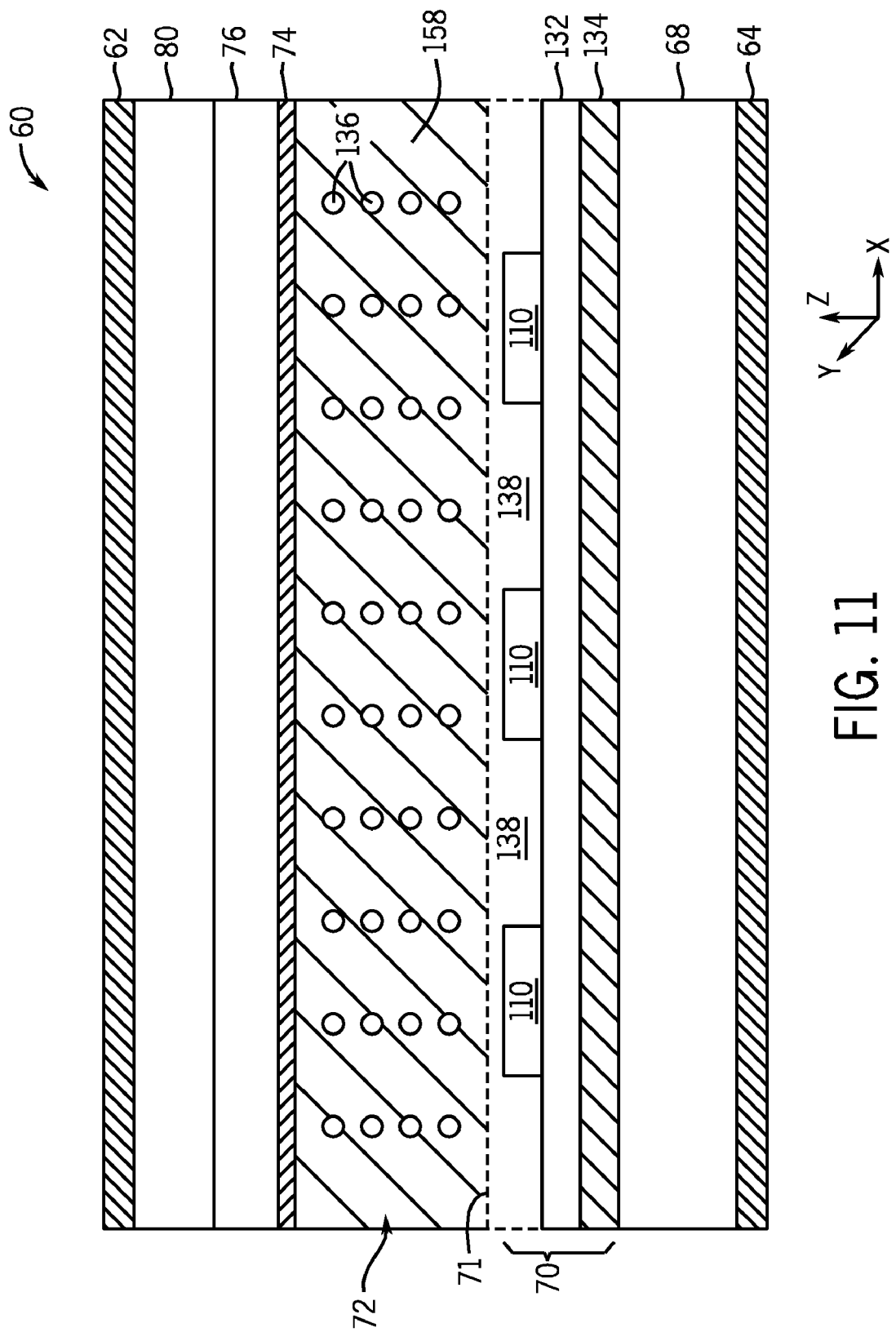
FIG. 11 is a cutaway cross-sectional side view of an LCD pixel having a polymer network disposed among the liquid crystal molecules, in accordance with aspects of the present disclosure.

In certain embodiments, a polymer network may be disposed among the liquid crystal molecules 136 of the liquid crystal layer 72. FIG. 11, a cross-sectional view of a pixel 60 of the LCD 32, presents a representation of a polymer network 158. The polymer network 158 may include a complex of polymer strands disposed among the liquid crystal molecules 136. In certain configurations, the polymer network 158 may reduce response time R by biasing the liquid crystal molecules 136 toward an untwisted state. The concentration of the polymer network 158 may be less than about 25% of the liquid crystal layer 72 by weight. Further embodiments may employ a polymer network concentration of less than about 10% of the liquid crystal layer 72 by weight. Other embodiments may have polymer network concentrations less than approximately 1%, 2%, 4%, 6%, 8%, 12%, 15%, or 20%.

In certain embodiments, polymer strands may limit the rotation of the liquid crystal molecules 136. For example, when an electrical field E is applied, the liquid crystal molecules 136 may rotate. However, due to the presence of the polymer network 158, the liquid crystal molecules 136 may experience resistance to rotation. Specifically, certain liquid crystal molecules 136 may contact the polymer strands as the molecules 136 rotate, causing the strands to stretch. Due to the plastic nature of the polymer strands, the deformed polymer network 158 may bias the liquid crystal molecules 136 toward the untwisted state, thereby reducing the realignment time $T_{off}$. Furthermore, the biasing effect may also increase $T_{on}$ and/or the magnitude of the electrical field E needed to maintain $T_{on}$ because the molecules 136 may experience resistance to rotation. However, the increase in rotation time $T_{on}$ may be less than the decrease in realignment time $T_{off}$, resulting in a net reduction in response time R.

Additionally, in at least some embodiments, the polymer network 158 may improve the tolerance of the LCD 32 to mechanical distortion. For example, as generally noted above, an LCD panel including pixels 60 may be configured such that, in the absence of an electric field, the liquid crystal molecules 136 are substantially oriented parallel to the polarization axis of the lower polarizing layer 64 and perpendicular to the polarization axis of the upper polarizing layer 62. While this configuration generally inhibits light transmission through the upper polarizing layer 62, various mechanical forces acting on the LCD panel, such as pressure on certain portions of the panel from mounting components, user interaction with the panel, or the like, may be transmitted to some of the liquid crystal molecules 136. Such mechanical forces on some of the liquid crystal molecules 136, in turn, may cause these molecules to rotate into a different orientation, thus impacting the amount of light allowed to pass through the affected portions of the LCD panel. In some embodiments, however, the inclusion of the polymer network 158 may stabilize the liquid crystal layer 72 and reduce the magnitude of rotation of liquid crystal molecules 136 in response to mechanical forces on the LCD panel.

Certain embodiments may include both a polymer network 158 and a chiral dopant 142 within the liquid crystal layer 72. Parameters of the polymer network 158 and the chiral dopant 142 may be configured to further reduce response time R, decrease driving voltage V and/or increase transmittance T. For example, a right-handed chiral dopant 142 may be dispersed within a liquid crystal layer 72 having molecules 136 configured to twist in a counter-clockwise direction. As previously discussed, this configuration may reduce rotation time $T_{on}$, but increase realignment time $T_{off}$. In addition, a polymer network 158 may be disposed among the molecules 136 of the liquid crystal layer 72. The polymer network may reduce realignment time $T_{off}$, but increase rotation time $T_{on}$. By adjusting parameters of the chiral dopant 142 (e.g., pitch ratio d/p and/or concentration) and the polymer network 158 (e.g., concentration), a reduction in both rotation time $T_{on}$ and realignment time $T_{off}$ may be achieved. Therefore, response time R may be reduced in such configurations, thereby facilitating higher frame rates and/or smoother transitions between images on the LCD 32.

Figure 12:
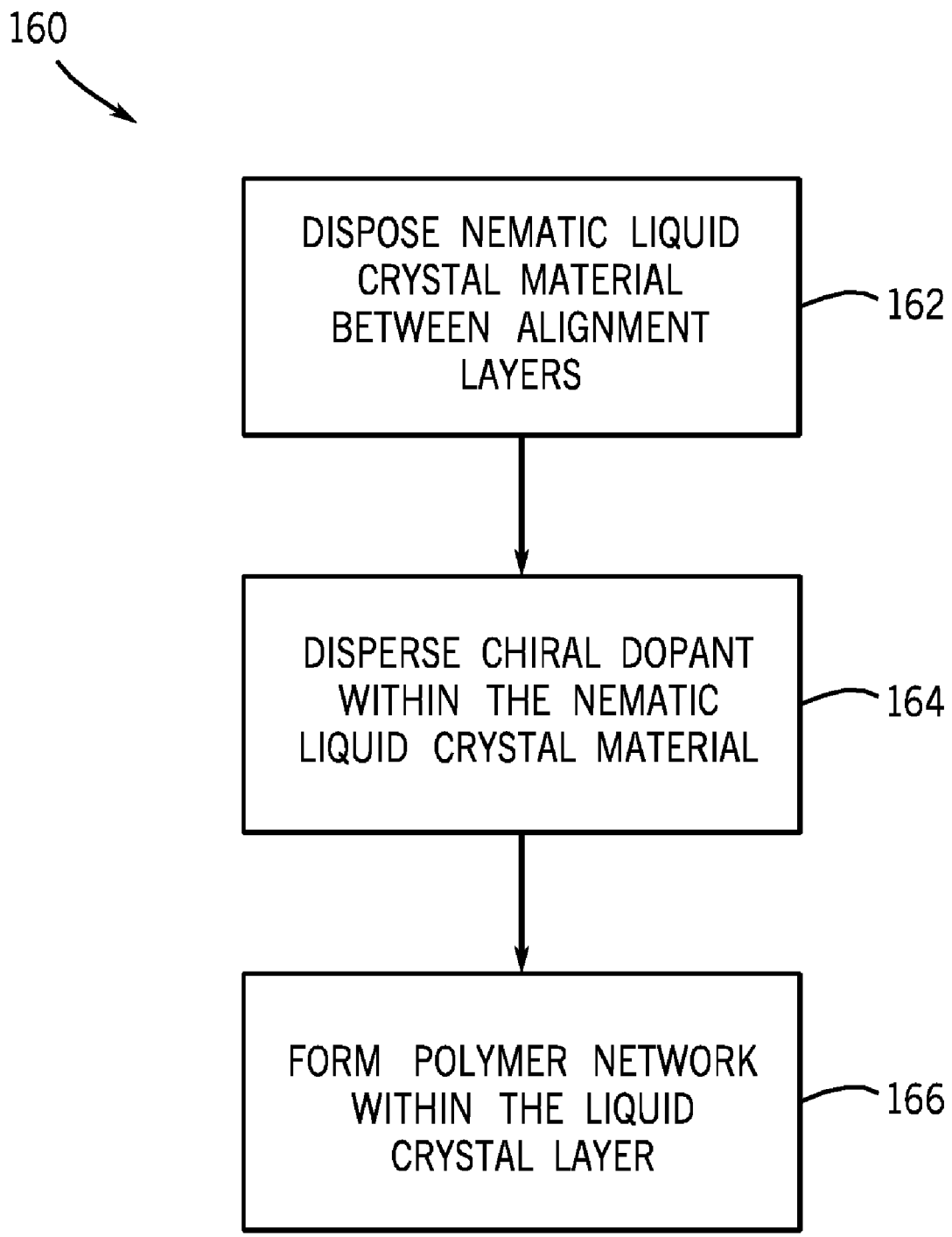
FIG. 12 is a flowchart of a method of manufacturing an LCD having a liquid crystal layer including a chiral dopant and a polymer network, in accordance with aspects of the present disclosure.

FIG. 12 is a flowchart of a method 160 of manufacturing an LCD 32 having a liquid crystal layer 72 including a chiral dopant 142 and a polymer network 158. As represented by block 162, the method 160 begins by disposing nematic liquid crystal material 140 between the alignment layers 71 and 74. As previously discussed, the alignment layers 71 and 74 may serve to align the liquid crystal molecules 136 in an untwisted state. Chiral dopant 142 may then be dispersed within the nematic liquid crystal material 140, as represented by block 164. The chiral dopant 142 may be configured to decrease response time R, reduce driving voltage V and/or increase transmittance T. Finally, as represented by block 166, a polymer network 158 may be disposed between the alignment layers 71 and 74 with the liquid crystal layer 72. For example, the nematic material 140 and the chiral dopant 142 may be mixed with a solution capable of polymerization (pre-polymer). The solution may then be polymerized, forming a polymer network 158 within the liquid crystal layer 72. As will be appreciated, other methods of forming a polymer network 158 may be employed in alternative embodiments.

The order of steps within method 160 may be rearranged in alternative embodiments. For example, the chiral dopant 142 may be dispersed within the nematic liquid crystal material 140 prior to disposing the mixture between the alignment layers 71 and 74. Similarly, the pre-polymer solution may be mixed with the nematic material 140 and/or the chiral dopant 142 prior to disposition between the alignment layers 71 and 74. Furthermore, the nematic liquid crystal material 140, the chiral dopant 142 and/or the pre-polymer solution may be disposed on the lower alignment layer 71. The upper alignment layer 74 may then be placed over the mixture, forming the liquid crystal layer 72.

While the preceding examples describe configurations of pixels for use in a FFS LCD device, it should be understood that these examples are not intended to be limiting in scope and, indeed, the present teachings may also be applicable to other types of LCDs or display panels, such as IPS LCDs or others. More generally, while the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A liquid crystal display (LCD) panel, comprising:
    a liquid crystal layer disposed between two substrates, the liquid crystal layer including:
        a nematic liquid crystal material comprising a plurality of liquid crystal molecules in an untwisted state;
        a right-handed chiral dopant dispersed within the nematic liquid crystal material and configured to bias the plurality of liquid crystal molecules in a right-handed direction while maintaining the liquid crystal molecules in the untwisted state; and
        a polymer network disposed among the plurality of liquid crystal molecules and configured to bias the liquid crystal molecules toward the untwisted state.

2. The LCD panel of claim 1, wherein the LCD panel comprises a fringe field switching (FFS) LCD panel.

3. The LCD panel of claim 1, wherein the right-handed chiral dopant is less than about 1% of the liquid crystal layer by weight.

4. The LCD panel of claim 1, wherein the polymer network is less than about 10% of the liquid crystal layer by weight.

5. The LCD panel of claim 1, wherein a ratio of a thickness of the liquid crystal layer between the two substrates to a pitch of the right-handed chiral dopant is less than about 1.

6. The LCD panel of claim 1, wherein a ratio of a thickness of the liquid crystal layer between the two substrates to a pitch of the right-handed chiral dopant is between about 0.01 to 0.8.

7. An electronic device, comprising:
    one or more input structures;
    a storage structure encoding one or more executable routines;
    a processor capable of receiving inputs from the one or more input structures and of executing the one or more executable routines when loaded in a memory; and
    a liquid crystal display (LCD) capable of displaying an output of the processor, wherein the LCD includes:
        a pixel electrode;
        a common electrode disposed adjacent to a first side of the pixel electrode; and
        a liquid crystal layer disposed adjacent to a second side of the pixel electrode, the second side being substantially opposite from the first side, wherein the liquid crystal layer comprises a plurality of liquid crystal molecules in an untwisted state;
    wherein the plurality of liquid crystal molecules are configured to twist in response to an electrical field generated between the pixel electrode and the common electrode, and wherein the liquid crystal layer comprises a chiral dopant configured to bias the plurality of liquid crystal molecules toward a twisted state while permitting the plurality of liquid crystal molecules to remain in the untwisted state until the electrical field is applied.

8. The electronic device of claim 7, wherein the chiral dopant enables reduction of a response time of the LCD at a given driving voltage.

9. The electronic device of claim 7, wherein the chiral dopant enables reduction of a driving voltage of the LCD while maintaining a response time of the LCD.

10. The electronic device of claim 7, comprising a polymer network disposed within the liquid crystal layer.

11. The electronic device of claim 10, wherein the polymer network is configured to reduce a response time of the LCD.

12. A display panel comprising:
    a liquid crystal layer having a thickness and a plurality of liquid crystal molecules configured to transition between an untwisted state that inhibits transmission of light through the display panel and a twisted state that facilitates transmission of light through the display panel, wherein the liquid crystal layer includes an amount of chiral dopant sufficient to bias the liquid crystal molecules toward the twisted state but less than that which would effect rotation of the liquid crystal molecules toward the twisted state in the absence of an electrical field.

13. The display panel of claim 12, wherein the chiral dopant is less than about 0.20% of the liquid crystal layer by weight.

14. The display panel of claim 12, wherein the chiral dopant is between about 0.05% and 0.75% of the liquid crystal layer by weight.

15. The display panel of claim 12, wherein a ratio of the thickness to a pitch of the chiral dopant is between about 0.05 and 0.55.

16. A liquid crystal display (LCD) panel comprising:
    a liquid crystal layer having a plurality of liquid crystal molecules configured to transition between an untwisted state that inhibits transmission of light through the LCD panel and a twisted state that facilitates transmission of light through the LCD panel, wherein the liquid crystal layer includes an amount of chiral dopant sufficient to bias the liquid crystal molecules toward the twisted state but less than that which would effect rotation of the liquid crystal molecules toward the twisted state in the absence of an electrical field, and a polymer network configured to bias the liquid crystal molecules toward the untwisted state.

17. The LCD panel of claim 16, wherein the polymer network is less than about 20% of the liquid crystal layer by weight.

18. The LCD panel of claim 16, wherein the polymer network is between about 1% and 15% of the liquid crystal layer by weight.

19. The LCD panel of claim 16, wherein the chiral dopant is configured to reduce a response time of the LCD panel.

20. The LCD panel of claim 16, wherein the polymer network increases the tolerance of the LCD panel to mechanical distortion.

21. A method of manufacturing a fringe field switching (FFS) liquid crystal display (LCD) panel, the method comprising:
    forming a liquid crystal layer, wherein forming the liquid crystal layer comprises:
        disposing nematic liquid crystal material between a plurality of alignment layers, wherein the nematic liquid crystal material comprises a plurality of liquid crystal molecules in an untwisted state;
        dispersing an amount of chiral dopant within the nematic liquid crystal material sufficient to bias the plurality of liquid crystal molecules toward a twisted state while maintaining the liquid crystal molecules in the untwisted state, wherein the chiral dopant is configured to reduce a response time of the FFS LCD panel; and
    forming a polymer network within the liquid crystal layer, wherein the polymer network is also configured to reduce the response time of the FFS LCD panel.

22. The method of claim 21, wherein the chiral dopant is dispersed within the nematic liquid crystal material prior to disposing the nematic liquid crystal material between the plurality of alignment layers.

23. The method of claim 21, wherein forming the polymer network comprises dispersing a pre-polymer solution within the liquid crystal layer prior to disposing the nematic liquid crystal material between the plurality of alignment layers.

24. The method of claim 23, wherein forming the polymer network comprises polymerizing the pre-polymer solution after dispersing the chiral dopant within the nematic liquid crystal material.

25. The method of claim 21, wherein disposing the nematic liquid crystal material between the plurality of alignment layers comprises disposing the nematic liquid crystal material on a first alignment layer and disposing a second alignment layer on the nematic liquid crystal material.

* * * * *